July 23, 1968   F. A. DURAND, JR   3,393,800
METHOD AND APPARATUS FOR MEASURING LIGHT
Filed Oct. 21, 1965   2 Sheets-Sheet 1
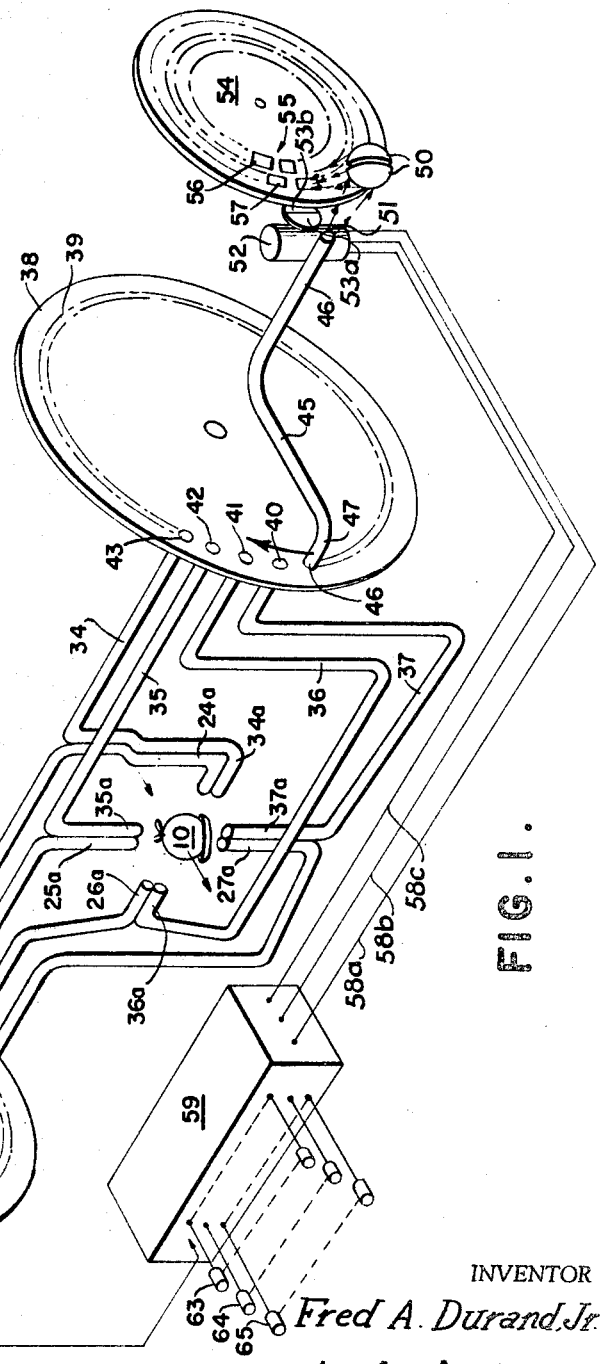
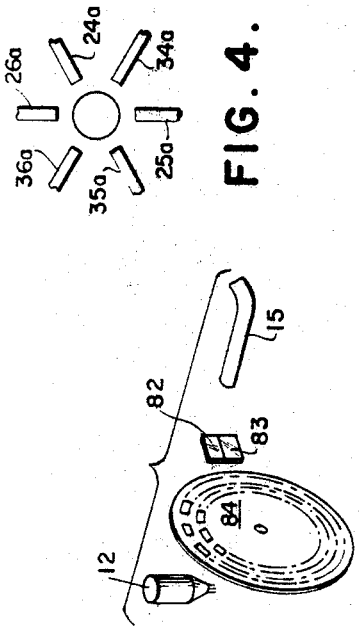
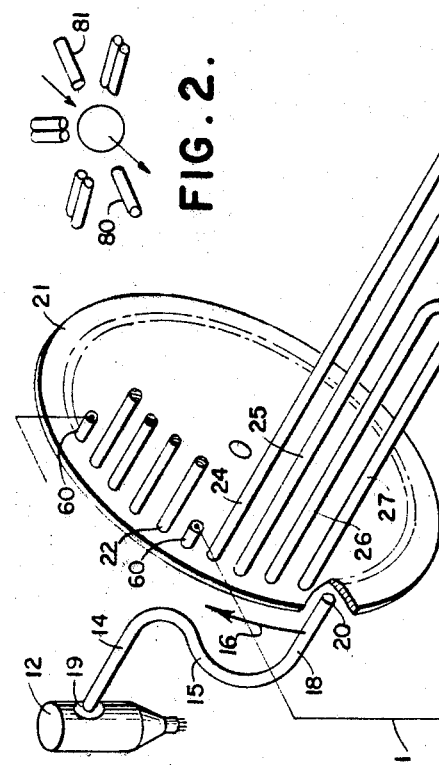
INVENTOR
*Fred A. Durand Jr.*
BY *Newton, Hopkins, Jones & Ormsby*
ATTORNEYS July 23, 1968   F. A. DURAND, JR   3,393,800
METHOD AND APPARATUS FOR MEASURING LIGHT
Filed Oct. 21, 1965   2 Sheets-Sheet 2

INVENTOR.
FRED A. DURAND, JR.
BY Newton, Hopkins,
Jones & Ormsby
ATTORNEYS 3,393,800
METHOD AND APPARATUS FOR
MEASURING LIGHT
Fred A. Durand, Jr., Woodbury, Ga. 30293
Filed Oct. 21, 1965, Ser. No. 499,608
13 Claims. (Cl. 209—111.7)

ABSTRACT OF THE DISCLOSURE

Method and apparatus for detecting and measuring light transmitted through and reflected from the surfaces of a plurality of articles. A single light source illuminates several areas of each of a plurality of articles, and the light transmitted through the articles is reflected from each of the several areas of the articles and is measured with a single measuring and detecting means.

Background of the invention

The surface color of fruit often serves as an indicator of the quality of its interior portion, and in many respects, is nature's method of indicating prime eating quality in natural foods. In many instances the United States Department of Agriculture has set standards for quality of food products by classifying the products in accordance with their exterior color. Accordingly, this has resulted in visual grading of foods by their color, which is dependent upon the grader's ability to perceive color differences, and his judgment of the equivalence of the color of the food product to the grade requirement standard. The grader's ability is influenced by working conditions and is subject to fatigue which results in a breakdown in the established standards of the grades of food. When it is considered that during a single season hundreds of thousands of tons of a single type of food are inspected by hundreds of inspectors in a single state, it is impossible to comply exactly with the standards promulgated by the Department of Agriculture because of the multitude of human judgments that must be made in the course of such a large magnitude of food grading. Furthermore, the grader's ability is further influenced by the grower's insistence that his product is of the finest quality, which of course is reflective upon the price that the grower receives from the ultimate sale of his product.

As a result of the problems in the industry, an effort has been made to devise a method of sorting products with the use of mechanical means which excludes the shortcomings of human judgment and personal prejudices. Recently, light sensitive cells have been arranged to measure light reflected from articles to be classified or sorted according to the quality of their surfaces. The surfaces of the articles are illuminated by a light source at two wave lengths and photo-sensitive cells are positioned so that the intensity of the wave lengths of the light reflected from the surface of the article are measured by the cell. With this arrangement an article having a surface quality that reflects a large amount of one color of light as compared to another color, with little regard to the total intensity of the reflection due to the size of the article, causes the photo cell to emit a signal that causes the article to be classified or sorted differently from the next article which has a surface quality that reflects a different ratio of color comparison. For instance, with the use of red and green filters the amount of red light reflected from a surface can be compared with the reflected green light so that articles reflecting a high ratio of red-to-green light can be classified or sorted in one category while objects reflecting a small ratio of red-to-green light can be classified or sorted differently. By the use of this principle, fruit, such as apples or tomatoes, has been successfully sorted so that the red fruit, which reflects a certain red-to-green ratio, can be classified or sorted in one category while the green fruit, which reflects a different ratio, can be classified and sorted into another category.

While the prior art shows an improvement over manual sorting of articles, the prior sorting machines are still somewhat inefficient since they require first, one or more light analyzing units for each conveyor line of articles to be sorted, and second, an individual light source for each article to be illuminated. For instance, in analyzing the reflective qualities of several surfaces on each of a plurality of articles on a multiple conveyor line, the most efficient method in use today requires a light source and a photo-sensitive cell for each conveyor line. This demands a plurality of light sources, one for each conveyor line, which are exactly equal in quality so that identical surfaces of articles on different conveyor lines will reflect identical light qualities. Also each conveyor line requires a photo-sensitive cell with either identical sensitivity or complex equalizing circuits so that identical electrical signals are emitted for identical light reception if the articles are to be classified or sorted on the basis of identical standards, and constant attention is required to insure that the system remains balanced. Furthermore, if the system has to be adjusted to change the level of decision, as when sorting a different fruit or a different variety of the same fruit, each of the individual analyzing units must be carefully readjusted to the new standards.

Summary of the invention

This invention involves a method and apparatus for utilizing a single light source to illuminate a plurality of areas of articles to be classified and sorted on a plurality of conveyor lines, and detecting and measuring the light transmitted through each of the plurality of articles or reflected from each of the areas of each of the plurality of articles with a single photo-sensitive cell. With this arrangement, it can be seen that a single light source will illuminate the plurality of areas of each of the plurality of articles with equal quality so that the light transmitted through the articles or the reflection from each of the areas will be exactly proportional to the interior quality of the article or the reflective quality of its surface, respectively. Furthermore, since a single photo-sensitive cell is utilized to measure the light transmitted through or reflected from each of the plurality of articles, the signal emitted by the photo-sensitive cell will be a function of the quality of the article from which the light travels.

Accordingly, it is an object of this invention to provide a method and apparatus for accurately detecting and measuring light reflected from an article.

Another object of this invention is to provide a method and apparatus for accurately detecting and measuring light transmitted through an article.

Another object of this invention si to provide a method and apparatus for precisely observing and measuring light transmitted through a plurality of articles or reflected from a plurality of surfaces of each of a plurality of articles in a manner so that the interior quality of each of the plurality of articles or each of the surfaces of each of the plurality of articles can be characterized accurately with respect to each other in accordance with the quality of the light transmitted through or reflected from each of the plurality of surfaces.

Another object of this invention is to provide a method and apparatus for sorting articles, such as fruit, in accordance with their quality and ripeness.

Other and further objects and advantages of the invention will be apparent from the following specification taken in conjunction with the accompanying drawings, wherein corresponding characters of reference designate the same or similar parts throughout the several views, and in which:

Brief description of the drawing

FIG. 1 is a schematic perspective view showing a method and apparatus for illuminating a plurality of surfaces of an article, and measuring the amount of light reflected therefrom;

FIG. 2 is a partial schematic view of another form of my invention, showing the method and apparatus of detecting and measuring the light reflected from the surface of an article and the amount of light passing through the interior portion of an article;

FIG. 3 is a partial schematic exploded view of another form of my device, showing a method and apparatus for alternately illuminating the surface of an article with different colored lights;

FIG. 4 is a partial schematic view of another form of my invention, showing a method of illuminating an article from different angles.

Description of the embodiments

Figure 5:
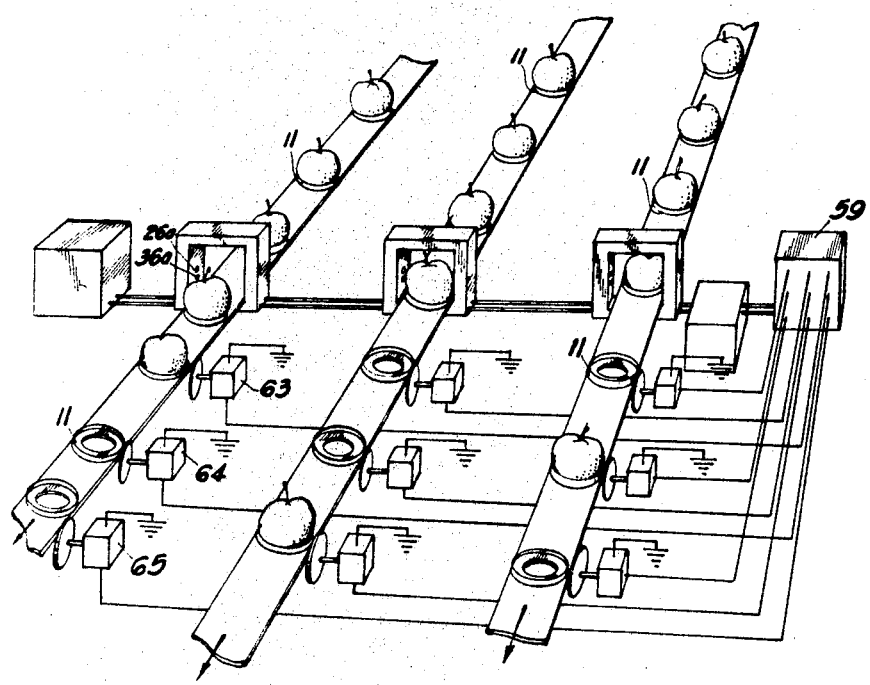
FIG. 5 is a schematic view of a plurality of conveyor lines, showing how the articles are conveyed and classified.

While the drawings of this application are presented in schematic form for the purpose of clarity, it should be pointed out that the obvious mechanical elements required to carry out the function of the invention and render it operable are deemed to be within the spirit and scope of this invention.

As is shown in FIG. 1, an article, such as an apple 10, is conveyed along a line in a conveyor cup 11 until it reaches a point where it is in the vicinity of a plurality of glass rods positioned generally in a plane perpendicular to the path of the travel of the article and disposed circumferentially around the article at approximately 90 degrees spacing. A light source, such as light 12, is positioned so that it will illuminate one end 14 of a rotating glass rod 15 which is formed in the shape of a crank. While various types of light communicating means have been used to practice the invention, glass rods of the type which might be utilized in the invention are fiber optic light guides and are made of precision optical fibers 0.003 inch in diameter. These particular glass rods have a core of 1.62 indexed glass and have been coated or clad with a 1.52 indexed glass to serve as optical insulation and thus protect the reflective surface of the core. Glass rods of this type will accept 70% of the light incident upon its input end, and of the light entering the glass rod, 50% will be absorbed for every seven feet of rod length. The fibers within the rod will transmit wave lengths of from 4,000 to 20,000 Angstroms.

As indicated by the arrow 16, the rod 15 rotates about the axis of its end portion 14 so that its other end portion 18 describes a circle. The ends 19 and 20 of the rod 15 are ground flat so that they are disposed perpendicular to the longitudinal axis of the rod. A stationary disc 21 is positioned parallel and coaxial with the circle described by the end 20 of the rod 15. The disc 21 defines a plurality of apertures 22 around its outer rim which are arranged in a circle such that the end 20 of the rotating light transmitting rod 15 will be in momentary juxtaposition with each aperture doing one revolution. Protruding through each aperture 22 of the disc 21 is a stationary transmitting rod such as the rods 24, 25, 26 and 27. The ends of these rods (not shown) are disposed perpendicular to the axis of each rod so that the end 20 of the rotating transmitting rod 15 will come into close registration with each of the stationary transmitting rods, such as the rods 24–27, upon each revolution. The stationary transmitting rods 24–27 extend from the disc 21 toward the conveyor line in such a manner that their remote ends 24a, 25a, 26a, and 27a are disposed at intervals spaced around the conveyor line and in a plane generally perpendicular to the motion of the conveyor line.

Another series of glass rods is disposed in a similar but opposite arrangement to rods 24–27. The stationary receiving rods 34, 35, 36 and 37 have ends 34a, 35a, 36a and 37a disposed in parallel relationship with each of the ends 24a–27a. For instance, the receiving rod 34 has its end 34a disposed parallel to the end 24a of the transmitting rod 24. Similarly, the receiving rod 35 has its end 35a disposed parallel to the end 25a of the transmitting rod 25. The receiving rods 34–37 extend toward the stationary disc 38 and through apertures 39 defined by this disc, similar to the apertures 22 defined by the disc 21. The ends 40, 41, 42 and 43 of the receiving rods 34–37 are disposed perpendicular to the longitudinal axis of each of the rods similar to the ends (not shown) of the rods 24–27.

A rotating receiving rod 45 in shape of a crank, similar to rod 15, is mounted so that it rotates about the axis of its end portion 46 so that its other end portion 47 describes a circle in a manner similar to the end portion 18 of the rod 15. The end 48 of the rotating receiving rod 45 is also perpendicular to the longitudinal axis of the rod 45 and is disposed so that it will come into close registration with the ends, such as ends 40–43, of each of the stationary receiving rods inserted through the apertures 39 of the stationary disc 38. The rotating rod 45 terminates at end 51 which is also perpendicularly disposed with the longitudinal axis of the rod.

The end 51 of the rotating rod 45 is positioned so that any light transmitted therethrough impinges on the split concave mirror 50. A photo-sensitive cell 52 is positioned so that it is in the path of the light reflected from the mirror 50, and a rotatable disc 54 with a plurality of apertures 55 therein is positioned with its apertured portion in the path of the light reflected from the mirror 50 toward the photo-sensitive cell 52. The apertures 55 are arranged in two concentric circles 56 and 57, and each aperture of the outer circle 57 is circumferentially displaced from each aperture of the inner circle 56 so that the light reflected from the split concave mirror 50 will pass alternately through the apertures of the inner and outer circles.

Light filters or attenuators of different colors 53a and 53b are placed in the path of the light reflected from the mirror 50 toward the photo-sensitive cell 52, between the cell and the rotatable disc 54, so that any light passing through the inner circle 56 of apertures from the mirror 50 will pass through a light filter of one color while any light passing through the outer circle 57 of apertures from the mirror 50 will pass through a light filter of another color, whereby the photo-sensitive cell 52 receives pulses of light alternating in color. The light pulses are detected by the photo-sensitive cell 52, which emits an electrical signal which at any instant is a function of the light applied to the detector 52. The electrical signal is fed through conductor 58 to the control box 59, where it is measured and categorized.

The stationary disc 21 has a plurality of photo-sensitive elements 60 spaced around the circle described by the rotating transmitting rod 15 so that there is one photosensitive cell 60 for every four stationary transmitting rods, such as rods 24–27. The cells 60 are arranged to receive the light transmitted by the rotating transmitting rod 15 as it comes into registration therewith, and upon registration, emit an electrical impulse through a conductor, such as conductor 61 which also leads to the control box 59.

The control box 59 is connected to a plurality of conveyor line solenoids, such as solenoids 63, 64 and 65, which are positioned along the conveyor line (FIG. 5) at appropriate positions to cause the conveyed fruit to be properly classified or sorted.

Operation

The invention shown in FIG. 1 is adapted to be utilized with a plurality of conveyor lines so that the articles conveyed thereby can be sorted or classified in accordance with the quality of their outside surfaces. Although only one set of glass rods is shown in FIG. 1, it should be understood that a plurality of these rods can be associated with the respective disclosed discs in a manner similar to that shown in FIG. 1. For instance, the discs 21 and 38 have been formed with enough apertures so that eight conveyor lines can be controlled by the system.

The light source 12 emits a light that is received by the end 19 of the rotating transmitting rod 15. As the rod rotates, as indicated by the arrow 16, the end 20 of the rod 15 comes into close registration, in succession, with each of the stationary transmitting rods protruding through the apertures 22 of the disc 21. In this manner light is successively received by each of the stationary transmitting rods, such as rods 24–27, which is transmitted to the ends 24a–27a of the rods which are in close proximity with the article, such as the apple, which is to be sorted. As each pulse of light is transmitted to the surface of the apple the ends of the stationary receiving rods, such as the ends 34a–37a of the rods 34–37, receive the light reflected from the apple and transmits it to their ends, such as ends 40–43. As the pulse of reflected light is received in succession at the ends of the stationary receiving rods the rotating receiving rod 45 is juxtaposed at the end thereof so that the light received by the stationary receiving rods 34–37 is transmitted to the rotating receiving rod 45, wherein it will be transmitted to the reflective surface 50, through the apertures 55, the filters 53a and 53b, and finally to the photo-sensitive cell 52, which emits a signal in accordance with the quality of the surface of the apple. As the glass rods 15 and 45 continue to rotate they will come into successive registration with the other glass rods that will be associated with other conveyor lines so that the articles transported by the other conveyor lines will be similarly illuminated with light so that their reflective surfaces will reflect the light in accordance with the quality of the surface, and the photo-sensitive cell 65 can emit a signal in accordance with the quality of the surface of the article tested.

It should be noted that the ends of the stationary transmitting and receiving glass rods, such as the ends 25a and 35a, are disposed parallel to each other so that the light transmitted by the rod 25 to the surface of the article to be classified will shine directly on a specific portion of the article and the rod end 35a will receive light reflected primarily only from that specific portion of the article to which the ends 25a of the transmitting rod 25 transmitted light. In other words, the arrangement of the ends of the rods forms a pair of rods in parallel disposition so that there is no possibility of the receiving rod receiving light transmitted directly from the transmitting rod. Furthermore, the fact that the photo-sensitive cell 52 is only instantaneously in contact with each stationary receiving rod, and the fact that only one transmitting rod is illuminated at a time, there is no possibility of a stationary receiving rod and the photo-sensitive cell receiving a pulse of light from a transmitting rod other than the transmitting rod with which the receiving rod is paired. Accordingly, no shielding apparatus is required to prevent light from entering the various stationary receiving rods.

Furthermore, this one-at-a-time illumination and reception also permits another mode of viewing, namely, viewing the object at a specified angle, such as 45 degrees between the transmitting rod and the receiving rod as is shown in FIG. 4. Since only one stationary receiving rod is in communication with the rotating receiving rod at any one time, any light that might be received by a stationary receiving rod other than the stationary receiving rod communicating with the rotating receiving rod will be ineffective in the system.

Since only a single light source illuminates all surfaces of the articles to be classified, each surface of the articles will have the same quality of illumination as all the other surfaces. This insures that if the articles being classified are of uniform surface qualities throughout their entire surfaces, a uniform amount of light will be transmitted by each of the receiving rods 34–37 to the rotating rod 45, and ultimately to the photo-sensitive cell 65. This is true, not only with each of the plurality of surfaces of a single article to be classified, but with each surface of each of the plurality of articles to be classified. For instance, if eight apples having surfaces of the same reflective quality are transported by each of the eight conveyors that can be associated with the disclosed embodiment of this invention, each of the four surfaces of each of the eight apples will be sequentially illuminated by the single light source with a uniform amount of light, and since each surface is of the same quality, an identical ratio of colors of light will be received and passed through the stationary receiving rods, such as rods 34–37, to the rotating receiving rod 45, and ultimately to the photo-sensitive cell 52. Accordingly the photo-sensitive cell will emit the same signal for each surface of each article so tested and each of the articles will be classified in the same manner with the associated apparatus in which the invention is designed to operate.

Since a certain amount of light is absorbed by the glass rod throughout a given length thereof, each of the transmitting and receiving rods must be dimensioned so that they are approximately equal in length to the other rods so that the light transmitted therethrough will be equally partially absorbed. If it is impractical to form the rods of equal length, filters of various fixed characteristics can be positioned over the ends thereof to compensate permanently for the varying absorption.

As the rotating transmitting rod 15 rotates, it transmits light to the photo-sensitive elements 60 located in the stationary disc 21 after every fourth stationary transmitting rod, such as rods 24–27. When the photo-sensitive cell 60 receives a pulse of light, an electrical pulse is transmitted via the electrical conductor 61 to the control box 59. When an electrical pulse is received from one of the photo-sensitive cells 60, the control box 59 uses this pulse to determine which conveyor line is to be acted on by the four signals to be received immediately thereafter by the photo-sensitive cell 52. When the four signals are fed to the control box 59 by the photo-sensitive cell 52, the solenoids, such as solenoids 63, 64, and 65, are selectively actuated to cause the article to be sorted in accordance with its quality. The control box can be made to respond to the average of the four signals occurring between pulses from cells 60, or it can be made to respond to the maximum or minimum of any single one of the four signals occurring between pulses from cells 60. For instance, the system is arranged so that if a low red-to-green light ratio is received by the photo-sensitive cell 52 the pulse transmitted thereby will cause the solenoid 65 to be actuated, while a higher red-to-green light ratio will cause the solenoid 64 to be actuated; a still higher red-to-green light ratio will cause the solenoid 63 to be actuated while a red-to-green light ratio over a predetermined maximum will not actuate any of the solenoids 63–65. Of course, when the apparatus is inspecting an article on another conveyor line another photo-sensitive cell 60 will have been actuated to channel the signal emitted by the photo-sensitive cell 52 to its proper destination so that the solenoids of the proper conveyor line will be actuated.

The rotating disc 54 rotates at a speed so that a plurality of the apertures 55 will pass between the mirror 50 and the photo-sensitive cell 52 while one light pulse is being received by the rotating receiving rod 45. With this arrangement the photo-sensitive cell 52 will receive at least one light transmission through each of the light filters between it and the rotating disc 54 to receive a color comparison of the article to be sorted.

FIG. 2 shows a different form of the device wherein the pair of glass rods are used in a manner similar to that previously described and another pair of glass rods is used in a manner different from that previously described. While the pairs of rods in FIG. 2 are used in a manner previously described, the rod 80 transmits the light pulse from the disc 21 toward the article being classified and the rod 81 receives whatever amount of light is transmitted through the article being classified. In other words, while the previous embodiment measured the reflective qualities of the surfaces of the article, this embodiment tests both the reflective qualities of the article and also the interior qualities. As in the case of testing apples, it can be seen that a ripe apple has a light-colored interior, the lightness of which is proportional to its water content. If an apple with a low water content is illuminated, its interior portion will be relatively dark and will not tend to transmit light. Accordingly, the light transmitted from the rod 80 will not easily be passed through such an apple so that a receiving rod 81 will receive a weak signal. The end of the rod 81 which is not shown, is arranged in a manner similar to the rods of the previous embodiment so that the light transmitted therethrough will be transmitted to the photosensitive cell, or as an alternate modification, the ends of the rods near the tested article could be disposed as shown in FIG. 1 and the ends of the rods at the disc 38 could be arranged so that the rotating receiving rod 45 receives a pulse of light transmitted through the tested article. For example, as the light is transmitted through the stationary receiving rod 27 of FIG. 1, the stationary receiving rod 35 could receive the light pulse transmitted through the article 10 and transmit it to the position in the disc 38 occupied by rod 37 so that it would be received by the rotating receiving rod 45. Thus, it will be appreciated that a minor rearrangement of the ends of the rods, either at their ends near the articles to be tested or at their ends near the disc 21 or 38, enables the apparatus to test the interior qualities of the articles. Of course, all the rods can be disposed in the arrangement of rods 80 and 81 of FIG. 2 so that the interior portion of the articles will be examined from several viewpoints; or, with the use of filters to render the light reflected from the surface of the articles proportional to the light transmitted through the articles, the reflective qualities of the articles can be tested simultaneously with their interior portions.

FIG. 3 shows a modified form of the present invention which utilizes a two-color filter arrangement at the light source 12 instead of the rotating disc 54. For instance, red and green filters 82 and 83 and a rotating apertured disc 84 are placed between the light source 12 and the rotating transmitting glass rod so that red and green light is alternately transmitted throughout the system. Of course, this allows for the omission of the rotating disc 54 and its mirror 50 and omission of filters 54a and 53b so that the photo-sensitive cell 52 could be located at the end 51 of the rotating receiving rod 45.

While a single basic disclosure of the invention is set forth herein, it should be obvious to those skilled in the art that various modifications thereof are obvious. For instance, while I have disclosed my invention as being adapted to eight conveyor lines, obviously a different number of conveyor lines could be incorporated into the system. Furthermore, while I have shown a single rod 80 being disposed to transmit light through the article, it would be obvious to have a plurality of such rods, or possibly have one transmitting rod and one receiving rod in a pair on one side of the article to operate in accordance with the embodiment disclosed in FIG. 1 and then place one receiving rod such as rod 81 opposite the pair of rods so as to function only as a receiving rod. In this manner, one transmitting rod could transmit a light that would be received by two receiving rods, one receiving from the surface of the article and the other receiving through the article itself. Obviously, many other variations can be made in the embodiment chosen only for the purpose of illustration of the present invention without departing from the scope thereof as defined by the appended claims.

What is claimed as invention is:

1. In apparatus for sorting objects conveyed along a plurality of predetermined paths by the measurement of light reflected by said objects and having selector means to select or reject objects to be sorted, the combination therewith of a single illuminating means arranged to sequentially illuminate object viewing points on each of said plurality of paths, a plurality of light conducting rods each having one of their ends disposed about and directed at each of said objects viewing points to receive light reflected directly from said objects, said rods extending to an area of observation for conducting the reflected light received by said rods directly to an area of observation, means at said area of observation for sequentially measuring the intensity of the light reflected from the objects in the plurality of predetermined paths and actuating said selector means to select or reject objects to be sorted in response to the intensity of the reflected light.

2. In apparatus for sorting objects carried by a plurality of conveyor lines by the measurement of light reflected by said objects and having selector means on each conveyor line to select or reject objects to be sorted, the combination therewith of a single illuminating means arranged to sequentially illuminate a plurality of areas of an object on each conveyor line, a plurality of light receiving means each having one end disposed adjacent and directed at each of said plurality of illuminated areas of the objects and arranged to receive light reflected directly from the areas of the object, said plurality of light receiving means each having another end disposed in an area of observation, means for conducting the reflected light received by said light receiving means to a single place of observation, and means at said place of observation for measuring the intensity of the reflected light and actuating said selector means on each conveyor line to select or reject objects to be sorted in response to the intensity of said reflected light.

3. The combustion as claimed in claim 2 and further comprising means for selecting or rejecting said objects to be sorted in response to the color of said reflected light.

4. Apparatus for measuring the surface qualities of objects on a plurality of conveyor lines comprising a single illumination means, a plurality of light transmitting means for transmitting light from said single illumination means to a plurality of points around each of said plurality of conveyor lines, a plurality of light receiving means for receiving the reflection from each of said points around each of said plurality of conveyor lines and a single measuring means for measuring the reflection received by said plurality of light receiving means.

5. Apparatus for measuring the interior and exterior qualities of an object comprising a single light source, means for transmitting the light emitted from said light source to a plurality of areas of an object, receiving means for receiving the reflection of said light from each of said areas of said object, receiving means for receiving the light passing through said object, and a single measuring means for receiving light from both of said receiving means and for measuring the light reflected from and passed through said object.

6. Apparatus for measuring the interior qualities of objects on a plurality of conveyor lines comprising means for illuminating objects on all of the conveyor lines from a single source of illumination and a single sensing means for measuring the light passing through said objects.

7. Apparatus for measuring the surface qualities of objects on a plurality of conveyor lines comprising means for illuminating a plurality of areas of objects on all of the conveyor lines from a single source of illumination and means for measuring the light reflected from all of the areas with a single light sensitive instrument.

8. A method of measuring the surface qualities of objects on a plurality of conveyor lines comprising illuminating a plurality of light transmitting means with a single light source, transmitting said illumination to a plurality of areas of said objects on said plurality of conveyor lines, receiving the reflection from each of said plurality of areas with a plurality of light receiving means, receiving said reflections from each of said plurality of light receiving means with a single light receiving means and measuring the light received in said single light receiving means.

9. A method of measuring the surface qualities of objects on a plurality of conveyor lines comprising illuminating a plurality of areas of objects on all of the conveyor lines with a single light source and measuring the light reflected from all of the areas with a single light sensitive instrument.

10. A method of determining the interior characteristics of objects on a plurality of conveyor lines comprising illuminating each object on all of the conveyor lines with a single light source and measuring the light passing through all of said objects with a single light sensitive instrument.

11. Apparatus for sorting objects conveyed along a plurality of conveyor lines comprising:
   a light source,
   a first rotatable light transmitting rod having a first end in continuous proximity with said light source and a second end movable in a circular path,
   a first plurality of stationary light transmitting rods each having one of their ends arranged in a circle coincident with said circular path, whereby movement of said second end of said first rotatable light transmitting rod causes said second end to be continuously sequentially juxtaposed with said one ends of said stationary light transmitting rods,
   said first plurality of stationary light transmitting rods having their second ends disposed at a preselected position about a point in each of said conveyor lines and adapted to transmit light thereto,
   a second plurality of stationary light transmitting rods each having one of their ends associated with one of said second ends of said first plurality of light transmitting rods and adapted to receive light transmitted by said one of said ends of said plurality of light transmitting rods and reflected from the conveyor line, said second plurality of stationary light transmitting rods having their second ends arranged in a circle,
   a second rotatable light transmitting rod having a first end in continuous proximity with a photosensitive cell, and a second end movable in a circular path coincident with the circle formed by the second ends of said second plurality of stationary light transmitting rods, whereby movement of said second end of said second rotatable light transmitting rod causes it to be continuously sequentially juxtaposed with said second ends of said second plurality of stationary light transmitting means.

12. Apparatus for sorting objects carried by a plurality of conveyors by the reflective qualities of their surfaces comprising:
   a source of illumination,
   light measuring means for measuring the intensity of light and emitting a signal corresponding to the intensity of the light measured,
   a first movable light transmitting member having a first portion thereof in continuous registration with the source of illumination and a second portion thereof movable over a first predetermined area to conduct light from the source of illumination over the first predetermined area,
   a series of groups of stationary light transmitting members, the light transmitting members of each group each having a first portion extending toward said predetermined area to receive light from the second portion of the first movable light conducting member and each having a second portion extending toward a viewing station of one of said conveyors to transmit light to its viewing station,
   a series of groups of stationary reflection receiving members, the reflection receiving members of each group each having a first portion extending toward a viewing station of one of said conveyors to receive light reflected from objects present on its conveyor and each having a second portion extending toward a second predetermined area to conduct the reflected light to said second predetermined area,
   a second movable light conducting member having a first portion thereof movable in timed relationship with said first movable light conducting member over said second predetermined area to receive the reflected light from said second series of stationary light conducting members and a second portion thereof in continuous registration with said light measuring means, and
   means for sorting the objects carried by the plurality of conveyors in response to the intensity of the reflected light received by said light measuring means.

13. The invention of claim 12 wherein said means for sorting the objects carried by the plurality of conveyors includes a photosensitive cell for each conveyor positioned in said first area, means responsive to said photosensitive cells for directing the signal emitted from said light measuring means to a predetermined conveyor.

References Cited
UNITED STATES PATENTS

| | | | |
|---|---|---|---|
| 2,881,919 | 4/1959 | Bartlett | 209—111.6 |
| 3,004,664 | 10/1961 | Dreyfus | 209—111.6 |
| 3,240,106 | 3/1966 | Hicks | 250—227 X |
| 3,245,533 | 4/1966 | Rottman | 209—111.7 |

M. HENSON WOOD, JR., *Primary Examiner.*

R. A. SCHACHER, *Assistant Examiner.*